Oct. 25, 1955 O. HACKER 2,721,483

TRANSMISSION GEARING

Filed Feb. 25, 1950 2 Sheets-Sheet 1

INVENTOR.
OSKAR HACKER
BY K. B. Mayr
ATTORNEY.

TRANSMISSION GEARING

Filed Feb. 25, 1950 2 Sheets-Sheet 2

INVENTOR.
OSKAR HACKER
BY
K. B. Mayr
ATTORNEY.

United States Patent Office 2,721,483

Patented Oct. 25, 1955

1

2,721,483

TRANSMISSION GEARING

Oskar Hacker, Vienna, Austria

Application February 25, 1950, Serial No. 146,218

17 Claims. (Cl. 74—191)

The invention relates to a transmission gearing comprising two pairs of friction links, each consisting of a hollow drum and a friction roller which revolves on the inside surface of the drum along selectable orbits of different diameter. The invention is chiefly specified by the fact that the friction links consist of two hollow drums and two friction rollers symmetrically shaped. The driving roller of the first friction link and the driven drum of the second friction link are arranged coaxially and independently rotatable, while the other friction link parts, also coaxially arranged, are coupled and adjustable in relation to the first driving roller and the second driven drum. The corresponding friction link parts which are permanently coupled are adjustably arranged between the first driving roller and the second driven drum in the casing, the two hollow drums tapering towards each other. In order to facilitate the change of speed the axle of the two jointly adjustable friction link parts is movable in the common way in relation to the common axis of the two other friction link parts firmly arranged in the casing.

It is a feature of the invention that the width of the surface for engagement of each drum is a multiple of the width of the peripheral surface of the roller with which it is in engagement, and that means are connected to the intermediate roller and intermediate drum jointly to displace them relative to the outer roller and outer drum in mutually opposite directions in respect of the joint axis of the outer roller and outer drum through a distance which is a multiple of the width of the surface for engagement of each roller, whereby the radius of the point of engagement of each roller from the axis of the drum with which it is in engagement is altered.

It is another feature of the invention to provide means supporting the intermediate roller and intermediate drum with freedom of pivotal movement in a direction extending crosswise to said axes of the outer roller and outer drum, and of the intermediate roller and intermediate drums, respectively, about a third axis.

It is another feature of the invention to provide guide means in a guiding relationship to said adjusting means and limiting the joint displacement of the intermediate roller and intermediate drum to positions in which said axis of the intermediate roller and intermediate drum intersects the axis of the outer roller and outer drum at an angle which increases with the degree of torque conversion. Said guide means may have a guide edge shaped according to a drum generatrix.

It is another feature of the invention to provide means to move the intermediate roller and intermediate drum crosswise to said axes of the outer roller and outer drum, and of the intermediate roller and intermediate drum, respectively, about said third axis.

The advantage of such a structural arrangement of a frictional transmission gearing is that it is less bulky than the conventional construction of frictional transmission gearing, at the same time providing for a minimum of outside dimensions, so that the gearing can be

2 installed even in a very limited space. Toothed wheels, universal joints etc., as hitherto required for the compensation of the eccentricities between friction rollers and drums, are no longer necessary. The construction of two pairs of friction links successively arranged also provides for an increase in the range of transmission.

As it is proved by experience that the elastic and adhesive covering, as hitherto attached to the friction rollers, is excessively stretched or may even be torn or separated from the roller owing to the centrifugal force, the elastic friction lining is, in accordance with the present invention for the purpose of avoiding such disadvantage, attached to the inside surface of the friction drums, so that the centrifugal force will press the lining closely to the inside surface of the drums. It is the total breadth of the lining which, conforming to the total range of transmission, is exposed to the stress of wear; in addition the heat is more efficiently carried off by the drum, whose wide outer surface can be cooled better than a friction roller arranged inside.

It is a well-known fact that tapering friction link parts running on or in each other, will not revolve faultlessly without slippage or distortion, unless the points of the tapers of a pair of friction links coincide; further it is known that, for the same reason, the friction surface of the drum must be conoidal, while the friction roller is conical. In accordance with these facts and as a further specification of the present invention, the shape, arrangement and operation of the friction link parts are so designed that the points of the two tapering and movable friction link parts, which are joined by a common axle, remain exactly or with very close approximation on the common axis of the two coaxially, but firmly arranged friction link parts, whatever their displacement in relation to the latter may be. When the common axle of the movable friction link parts is shifted from its starting position, characterized by the smallest conversion of torque within the complete range of transmission, into positions with increasing conversion of torque, it crosses the permanent and common axis of the driving roller and the second driven drum at an increasing angle. The conveyance of power through the two pairs of friction links is directed from the rollers to the drums; while this increases the surface pressure with growing conversion of torque, the number of load changes decreases at the contacting parts of the friction surfaces, and the torque of the output shaft of the gear is variable, but the torsional output is constant.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

A preferred form of the invention is shown in the drawings in which.

Figure 1:
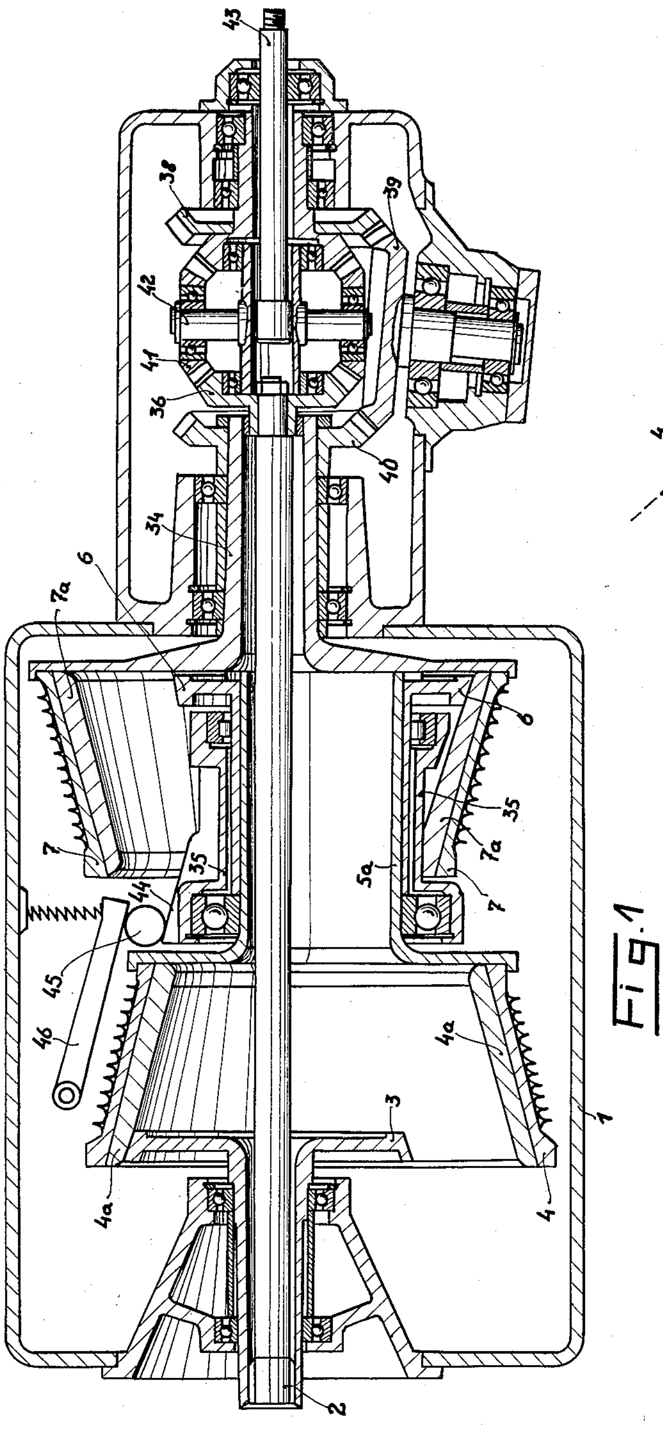
Fig. 1 is a section of one form of the transmission gearing in combination with a differential mechanism.

In accordance with Fig. 1 the driving power is conveyed to the first or outer roller 3 by shaft 2 mounted in casing 1, from roller 3 to the first or intermediate drum 4, which is permanently coupled with intermediate roller 6 by m
Roller 6 is cc
drum 7 conve
hollow shaft 3
and roller 6 :
according to tl
be facilitated b
4 and 6 in rel
middle friction
relation to the (
pair of frictior
pair. The ins
with a friction
the pressure lo
inside the drui
advantage of r
the centrifugal The left dif
driving shaft 2
is connected w
ing by means c
power is carri
cross 42 and
suitable selecti
wheels 40 and
that the outpu
both direction
mission ratio (
if the friction
tion, the diam
the smallest c
remains motio
of the wheels 4
will remain m
4 and 6 rotat
ratio of the b
by the transm
6, 7. By shif
or the other d
in, or opposit
shaft. The p
drums is trans
roller 45 of tl
ing point of p
the friction pa
45 rolling alo
press lever 46.

In Figs. 2–5
cal friction ro
is arranged in
roller 3, conv
to the gearing
the hollow dr
this hollow d
drum 4 is con
roller 6 is in i
of the drum 7
shaft 9.

Figure 5:
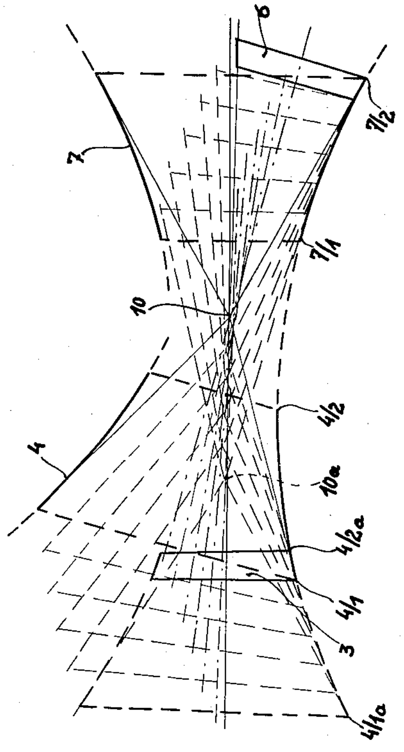
Fig. 5 is a diagrammatic view of the friction links in different positions of operation.
Figure 2:
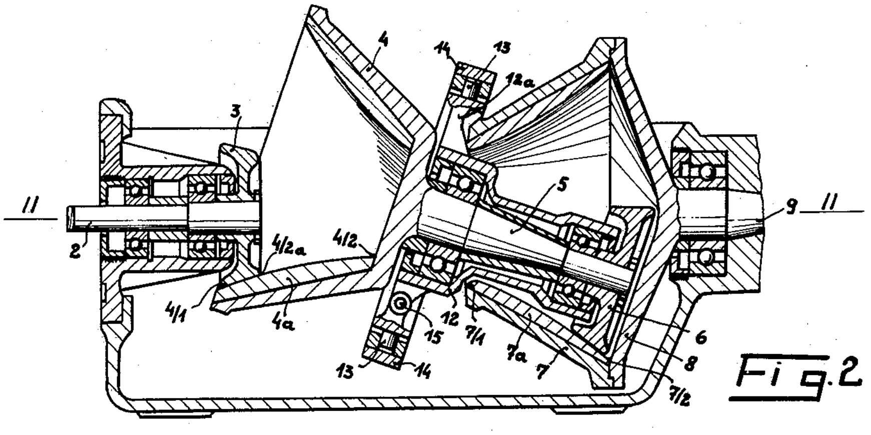
Fig. 2 is a longitudinal section of one form of the transmission gearing.
Figure 3:
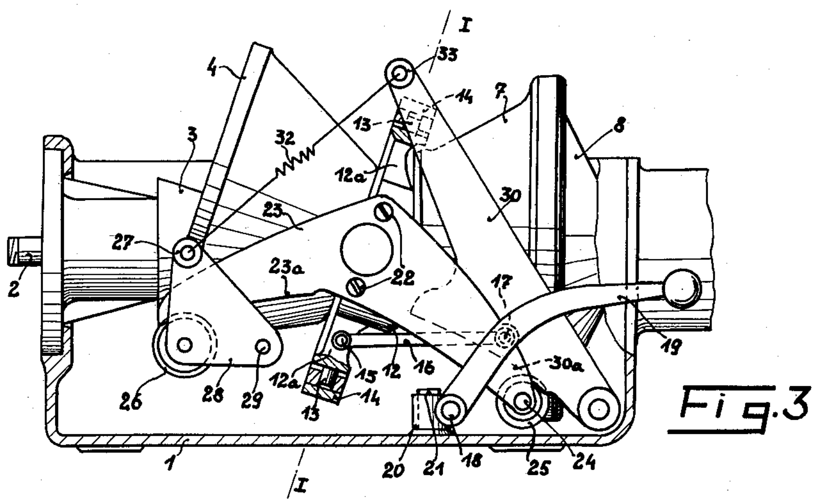
Fig. 3 is a side view of one form of the transmission gearing with the adjusting mechanism.
Figure 4:
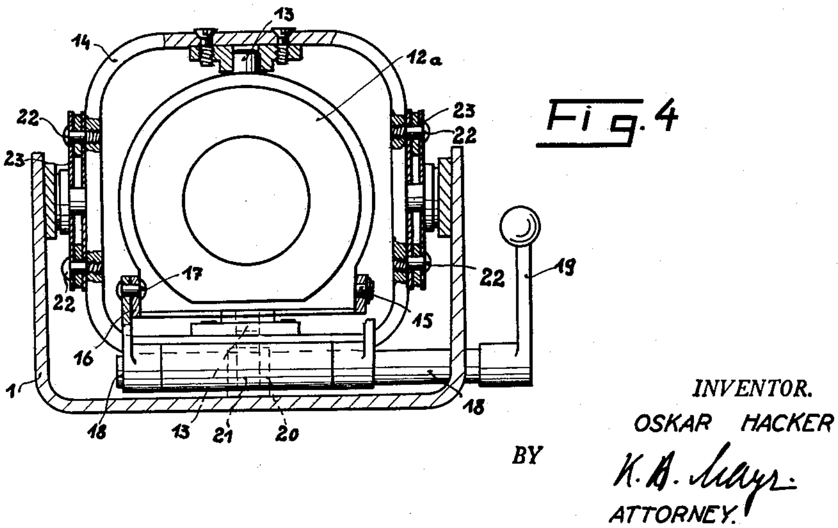
Fig. 4 is a cross section of one form of the transmission gearing, taken along the line I—I in Fig. 3.

Fig. 5 illust
tion roller 3 a
4 or of the l
special positio
breadth of the
trated in the
take place wi
lining. The
and that of th
lining 7a resp
tion, also coi
rolling moven
exact. As th
arranged in tl
these friction
order to ascei
the points of ast,
axis
arts ices
ums
one
ig. 5
The
ions
the
n 4
the
ntly
the
oin-
r 6.
um
tely
ent
ller
the
ing
ller ces-
tion
oad
lent
erse
ans
the
ure
um
sive
sure
atio
on
fact
ear-
r 3
by
mis-
for
the
the
ere-
ssed
tion
tion
in a
and
able
of
num
sur-
in-
um-
and
the
tion
the
sive
mis-
sure ame
vor-
tion
que,
ther
orce
the
ands
important to compensate the compressive stress of the roller increasing with the transmission ratio, by an adequately decreasing number of load changes of the friction lining.

For this purpose the adjustable friction link parts 4 and 6 are housed in a sleeve 12, which by its flange 12a and pivots 13 is connected with a ring 14. This ring is connected with two adjusting levers 23 by screws 22. Each of these levers is supported at one end by a pressing roller 26, at the other by another pressing roller 25, mounted at 24, thus resting on a pressing lever 30, mounted at 31 in the gear case. The pressing roller 26 is arranged in a bell crank lever 28 which is pivoted at 29 in the gear case. The tension of a draw spring 32, linked to the bell crank lever 28 at 27 and to the pressing lever 30 at 33, forces the pressing roller 26 against the rim 23a of the adjusting lever 23. This rim 23a has the same curvature as the generatrix of the cone, along which the movable friction link parts are shifted for the purpose of altering the transmission ratio. Thus the pressure exerted upon the lever 23 remains constant in all positions. The spring 32 at the same time presses the lever 30, pivoted at 31, against the roller 25 of the adjusting lever 23, the pressure employed being, however, varying and dependent on the eventual position of the movable friction link parts. The arrangement is made to the effect that the pressing roller 25, participating in the adjusting process by its arrangement on lever 23, advances towards the pivot of lever 30 with increasing transmission ratio. Accordingly the pressure exerted upon the pressing roller 25 by the rim 30a, the curvature of which follows that of the generatrix of the drum cone, increases with the transmission ratio. Thus it is apparent that roller 25 forms part of adjusting means comprising in addition thereto the sleeve 12, pivots 13, ring 14, and adjusting levers 23, and serving for jointly displacing the intermediate drum 4 and the intermediate roller 6 relative to the outer roller 3 and outer drum 7, whereby the radius of the point of engagement of each roller from the axis of the drum with which the roller is in engagement is altered. Further it is apparent that the lever 30 constitutes guide means having a guide edge consisting of rim 30a shaped according to a drum generatrix, and that the roller 25 of the aforesaid adjusting means contacts said guide edge. The adjusting movements of the levers 23 do not influence the position of the roller due to the curved rim 30a. The pressing roller 26, due to its firm arrangement in the casing always remains at the point where the frictional contact between first roller 3 and first drum 4 takes place; at the same time the roller 25 moves along with the second roller 6 to any position within the adjusting range, thus always remaining where the second roller contacts the second drum.

The pressing rollers 26 and 25 urge the lever 23 into a clockwise rotation, the momentum of which is transmitted by the screws 22 onto the ring 14, by which it is carried onto the pivots 13 and finally onto the sleeve 12. Consequently the first drum 4 is pressed upwards against the first roller 3, and the second roller 6 is pressed downwards against the second drum 7. The arm 12a of the sleeve 12 carries a pivot 15 with an adjusting rod 16, which at 17 is connected with a shifter lever 19, which changes the transmission ratio. The bracket 20, supporting the horizontal axle 18 of the shifter lever, is movable around the vertical axle 21, when the shifter lever swings vertically in relation to the plane of drawing. This swinging movement is transmitted by the adjusting rod 16 to the pivot 15 of the flange 12a of the sleeve 12. As the latter is pivoted at 13 in the ring 14 the swinging movement of the shifter lever, vertical in relation to the plane of drawing, results in a crosswise lateral displacement of the sleeve 12 and of the movable friction link parts 4 and 6 in relation to the main axis 11 (2 and 9). This crosswise lateral displacement facilitates the adjusting process, when the transmission ratio is changed, and causes a helical movement of the rollers within the drums. After every completed change of transmission ratio the shifter lever is caught in an intermediate position; then the main axis 11 and the axle of the movable friction link parts lie in a common plane.

I claim:

1. A transmission gearing comprising a casing, an outer friction roller adapted to receive torque, an outer hollow drum adapted to transmit torque and mounted coaxially with said roller in said casing, an intermediate hollow drum the inside surface of which engages said outer friction roller, an intermediate friction roller coaxial with said intermediate drum and in engagement with the inside surface of said outer drum, means for coupling said intermediate roller for joint rotation with said intermediate drum, a spring-loaded lever and a pressing roller for urging said intermediate drum and intermediate roller against said outer roller and outer drum, respectively, and means for jointly displacing said intermediate drum and intermediate roller relative of said outer roller and outer drum, whereby the radius of the point of engagement of each roller from the axis of the drum with which the roller is in engagement is altered, each roller and each drum having a tapering engaging surface, the outer roller and intermediate drum being symmetrical to the intermediate roller and outer drum.

2. A transmission gearing comprising a casing, an outer friction roller adapted to receive torque, an outer hollow drum adapted to transmit torque and mounted coaxially with said roller in said casing, an intermediate hollow drum the inside surface of which engages said outer friction roller, an intermediate friction roller coaxial with said intermediate drum and in engagement with the inside surface of said outer drum, means for coupling said intermediate roller for joint rotation with said intermediate drum, a spring-loaded lever and a pressing roller for urging said intermediate drum and intermediate roller against said outer roller and outer drum, respectively, and means for jointly displacing said intermediate drum and intermediate roller relative of said outer roller and outer drum, whereby the radius of the point of engagement from the axis of the drum with which the roller is in engagement is altered, each roller and each drum having an engaging surface which tapers towards that of the other roller and drum, respectively, the outer roller and intermediate drum being symmetrical to the intermediate roller and outer drum.

3. A transmission gearing comprising a casing, an outer friction roller adapted to receive torque, an outer hollow drum adapted to transmit torque and mounted in said casing on a joint main axis with said roller, an intermediate hollow drum the inside surface of which engages said outer friction roller, an intermediate friction roller coaxial with said intermediate drum and in engagement with the inside surface of said outer drum, means for coupling said intermediate roller for joint rotation with said intermediate drum, an elastic friction lining constituting the inside surface of each drum, a spring-loaded lever and a pressing roller for urging said intermediate drum and intermediate roller against said outer roller and outer drum, respectively, and means for jointly displacing said intermediate drum and intermediate roller relative of said outer roller and outer drum, whereby the radius of the point of engagement of each roller from the axis of the drum with which the roller is in engagement is altered, the drums having conoidal and the rollers conical engaging surfaces, the generatrix of the conoidal engaging surface of each drum enveloping the extremities of the adjoining generatrix of the roller in engagement therewith, the engaging surfaces of the drums being of such conoidal shape that the points of said conical and conoidal engaging surfaces of said rollers and drums, respectively, are adjacent to said main axis in all positions of the intermediate drum and intermediate roller relative of the outer roller and outei
drum being syr
outer drum.
4. A transmi:
friction roller a
drum adapted t
with said roller
drum the inside
tion roller, an i
said intermediat
side surface of ·
intermediate rol
ate drum, the ‹
symmetrical to
a bearing sleev‹
ring, two diamet
supporting ring,
ring, a spring-l
end of each adj
end of each adj
lever urged ag
levers being ad:
drum and interı
and outer drun
gagement of ea
which the rolleı
5. A transmi
friction roller a
drum adapted ı
with said rolle:
drum the inside
tion roller, an
said intermedia
surface of said
mediate roller
drum, the outeı
metrical to th
bearing sleeve :
two diametral
supporting ring
ring, a spring-
end of each ad
end of each ad
lever urged aş
levers being ad
drum and inter
and outer drur
gagement of e:
which the rolle
ing lever and p
which is shape‹
6. A transmi
friction roller ɛ
drum adapted
with said rolle
drum the insid·
tion roller, an
said intermedi:
side surface of
intermediate r‹
ate drum, the
symmetrical tc
a bearing slee
ring, two dia:
said supportin.
said ring, a s:
one end of ea
other end of e:
lever urged ag
mounted in tl
pressing roller.
crank lever wi·
ing roller aga
lever against tl
adapted to jo:

ıter
of
the

ıter
!ow
ally
low
ric-
vith
ide
ter-
ate
/m-
, a
ng,
aid
aid
one
the
ess-
ver,
› as
ght
the
:ing
and
ıter
t of
ller
ıov-
the
tion
axis ıter
low
said
iate
said
co-
vith
ling
ıter-
edi-
uter
reby
rom
age-
per-
and
pec-
rum
heir
ıded
cou-
eeve,
for
oller
.
fric-
llow
n a
llow
uter
with
ıside
ring
ller,
oller
im-
ıas a
the
with
connected to said intermediate roller and intermediate drum jointly to displace them relative to said outer roller and outer drum in mutually opposite directions in respect of said main axis through a distance which is a multiple of the width of said peripheral surface of each roller, whereby the radius of the point of engagement of each roller from the axis of the drum with which the roller is in engagement is altered.

10. In a transmission gearing comprising an outer friction roller adapted to receive torque, an outer hollow drum adapted to transmit torque and mounted on a joint main axis with said roller, an intermediate hollow drum the inside surface of which engages with said outer friction roller, an intermediate friction roller mounted on a joint intermediate axis with said intermediate drum and in engagement with the inside surface of said outer drum, each drum having a tapering annular surface for engagement by the respective roller, and coupling means connecting said intermediate roller for joint rotation with said intermediate drum, the provision of means supporting the intermediate roller and intermediate drum with freedom of pivotal movement in a direction extending crosswise to said main and intermediate axes about a third axis, and of adjusting means for jointly displacing said intermediate drum and intermediate roller relative to said outer roller and outer drum in a direction whereby the radius of the point of engagement of each roller from the axis of the drum with which the roller is in engagement is altered.

11. In a transmission gearing comprising an outer friction roller adapted to receive torque, an outer hollow drum adapted to transmit torque, an intermediate hollow drum the inside surface of which engages with said outer friction roller, an intermediate friction roller coaxial with said intermediate drum and in engagement with the inside surface of said outer drum, and coupling means connecting said intermediate roller for joint rotation with said intermediate drum, the provision of an elastic friction lining providing a tapering inside surface for each drum and having a width which is a multiple of the width of the peripheral surface of the roller with which it is in engagement, and of adjusting means for jointly displacing said intermediate drum and intermediate roller relative to said outer roller and outer drum whereby the radius of the point of engagement of each roller from the axis of the drum with which the roller is in engagement is altered.

12. In a transmission gearing comprising an outer friction roller adapted to receive torque, an outer hollow drum adapted to transmit torque and mounted on a joint main axis with said roller, an intermediate hollow drum the inside surface of which engages with said outer friction roller, an intermediate friction roller mounted on a joint intermediate axis with said intermediate drum and in engagement with the inside surface of said outer drum, each drum having a tapering annular surface for engagement by the respective roller, and coupling means connecting said intermediate roller for joint rotation with said intermediate drum, the provision of adjusting means for jointly displacing said intermediate drum and intermediate roller relative to said outer roller and outer drum whereby the radius of the point of engagement of each roller from the axis of the drum with which the roller is in engagement is altered from an initial position in which the outer roller engages the intermediate drum at the smallest distance from the drum axis to a position where this distance is larger whereby the degree of torque conversion is increased, and of guide means arranged in a guiding relationship to said adjusting means and limiting the displacement of said intermediate roller and intermediate drum to positions in which said intermediate axis intersects said main axis at an angle which increases with the degree of torque conversion.

13. In a transmission gearing comprising an outer friction roller adapted to receive torque, an outer hollow drum adapted to transmit torque, an intermediate hollow drum the inside surface of which engages with said outer friction roller, an intermediate friction roller coaxial with said intermediate drum and in engagement with the inside surface of said outer drum, and coupling means connecting said intermediate roller for joint rotation with said intermediate drum, each drum having a tapering annular surface for engagement by the respective roller, the provision of resilient means connected to said intermediate roller and intermediate drum to urge them against said outer roller and outer drum, and of adjusting means for jointly displacing said intermediate drum and intermediate roller relative to said outer roller and outer drum, whereby the radius of the point of engagement of each roller from the axis of the drum with which the roller is in engagement is altered.

14. In a transmission gearing comprising an outer friction roller adapted to receive torque, an outer hollow drum adapted to transmit torque, an intermediate hollow drum the inside surface of which engages with said outer friction roller, an intermediate friction roller coaxial with said intermediate drum and in engagement with the inside surface of said outer drum, and coupling means connecting said intermediate roller for joint rotation with said intermediate drum, each drum having a tapering annular surface for engagement by the respective roller, the provision of adjusting means for jointly displacing said intermediate drum and intermediate roller relative to said outer roller and outer drum, whereby the radius of the point of engagement of each roller from the axis of the drum with which the roller is in engagement is altered, and of guide means defining a guide edge shaped according to a drum generatrix, said adjusting means contacting said guide edge.

15. In a transmission gearing comprising an outer friction roller adapted to receive torque, an outer hollow drum adapted to transmit torque and mounted on a joint main axis with said roller, an intermediate hollow drum the inside surface of which engages with said outer friction roller, an intermediate friction roller mounted on a joint intermediate axis with said intermediate drum and in engagement with the inside surface of said outer drum, each drum having a tapering annular surface for engagement by the respective roller, and coupling means connecting said intermediate roller for joint rotation with said intermediate drum, the provision of means supporting the intermediate roller and intermediate drum with freedom of movement in a direction extending crosswise to said main and intermediate axes about a third axis, and of adjusting means for jointly displacing said intermediate drum and intermediate roller relative to said outer roller and outer drum in a direction whereby the radius of the point of engagement of each roller from the axis of the drum with which the roller is in engagement is altered, and for jointly displacing said intermediate drum and intermediate roller in said direction crosswise to said main and intermediate axes about said third axis.

16. In a transmission gearing comprising an outer friction roller adapted to receive torque, an outer hollow drum adapted to transmit torque and mounted on a joint main axis with said roller, an intermediate hollow drum the inside surface of which engages with said outer friction roller, an intermediate friction roller mounted on a joint intermediate axis with said intermediate drum and in engagement with the inside surface of said outer drum, each drum having a tapering annular surface for engagement by the respective roller, and coupling means connecting said intermediate roller for joint rotation with said intermediate drum, the provision of means supporting the intermediate roller and intermediate drum with freedom of rotation in a direction extending crosswise to said main and intermediate axes about a third axis, and of an adjusting member connected to said intermediate drum and intermediate roller and pivota
each other, said
place said interm
tive to said out
radius of the pc
the axis of the e
ment is altered,
diate drum anc
crosswise to saic
third axis.

17. In a tra
friction roller a
low drum adap
a joint main ax
low drum the i
outer friction
mounted on a
mediate drum
face of said ot
annular surface
and coupling n
for joint rotatic
vision of adju
intermediate d
said outer roll
of the point of is
der
ice
ice
in-
on-
ate
on-
aid
um
ion
um
ely.

398
916
935
941

930
950
945